Nov. 4, 1952  M. M. HAMMERSTEIN  2,616,376
DOUGH SHAPER
Filed June 20, 1951
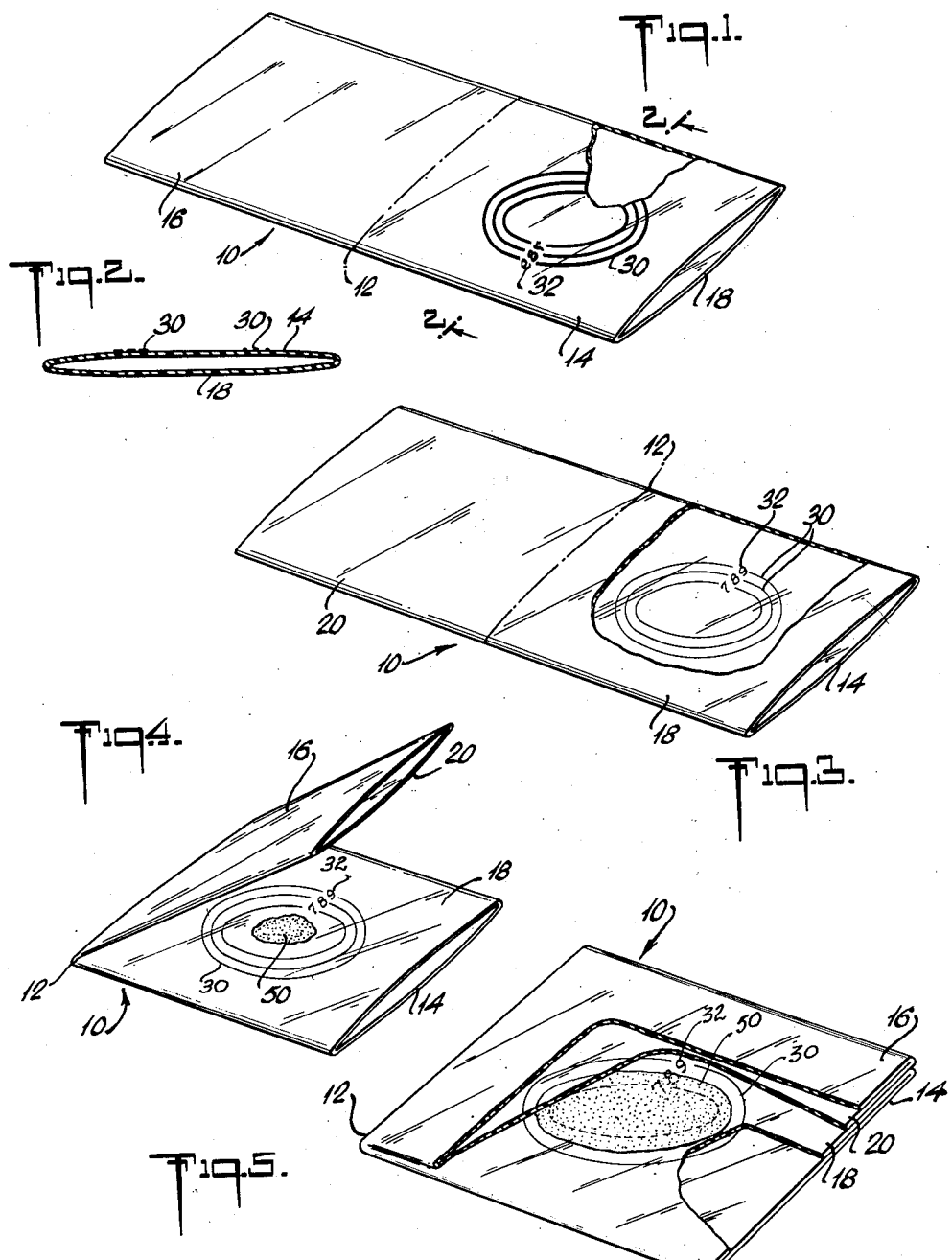
INVENTOR.
MARY MANNERS HAMMERSTEIN.
BY
William R. Liberman
ATTORNEY.

Patented Nov. 4, 1952

2,616,376

UNITED STATES PATENT OFFICE 2,616,376

DOUGH SHAPER

Mary Manners Hammerstein, New York, N. Y.

Application June 20, 1951, Serial No. 232,527

2 Claims. (Cl. 107—46)

The present invention relates generally to the art of baking. In particular, the invention relates to a device for working a mass of raw dough and adjusting it to any desired size and shape.

While the present invention will be described in respect of a device for forming a pie crust, it is not to be limited to such particular purpose, since it has other and equally applicable uses.

The main object of the present invention is the formation of a new and improved device for kneading and rolling a mass of raw dough.

Another object of the present invention is the provision of a device for kneading and rolling raw dough whereby any desired size and shape can be achieved easily and quickly.

Another object of the present invention is the provision of a device of the character described comprising a plurality of superposed layers of transparent material of such nature as to be relatively slidable.

Still another object of the present invention is the provision of a device of the character described comprising an elongated flattened tube of transparent material folded transversely on itself, having size and shape indicia on the lowermost fold thereof, visible through the folds atop same.

Other, further and more specific objects of the present invention will in part be apparent and in part specifically pointed out in the following description of an illustrative embodiment.

In the drawings annexed hereto and forming a part hereof,

Figure 1 is a perspective view of one form of device constructed according to and embodying the present invention, partly broken away, seen from the underside thereof;

Figure 2 is a section on the line 2—2 of Figure 1;

Figure 3 is a view similar to Figure 1 of the upper aspect of the device;

Figure 4 is a perspective view of the device illustrating a stage in its manipulation during use; and Figure 5 is a perspective view, with portions of the uppermost layers broken away, illustrating the position of the device during actual use.

The form of device illustrated is indicated generally by reference numeral 10, and comprises a flattened tube of preferably clear transparent plastic material. Vinyl plastic material in such thickness as to have a slight degree of stiffness has been found to be well adapted for the device of the present invention although other materials having the same degree of transparency may be used. While dimensions may be varied, it has been found that the device operates well when it is twice as long as it is wide, although these relative dimensions are not critical. Thus, when folded on itself along a median line 12, the superposed layers will be of equal size and square shape. With the invention embodied in tubular form, as illustrated, four layers or folds are provided. The lowermost layer 14 is coextensive lengthwise with the uppermost layer 16. The inner layers 18, 20 are similarly coextensive in length, and, of course, are edge united with the layers 14, 16.

Applied to lowermost layer 14 are a plurality of indicia 30, 32. As illustrated, indicia 30, 30 are concentric circles, and within the scope of the invention, may be of any shape. Indicia 32, 32 applied to the several indicia 30, 30 are size numbers. Thus, the outer circle 30 is of 9" diameter, while the innermost circle is 7" in diameter, and the interpositioned circle is 8" in diameter. More than three sets of indicia 30, 32 may be placed on layer 14, the desiderata in this respect being the ready visibility thereof through the other layers when the device is being used. Indicia 30, 32 are illustrated in exaggerated size in Figure 2, applied to the outer aspect thereof, but it is obvious that same may be applied to either or both faces of layer 14, the important feature being the ready visibility of the indicia through the upper layer or layers.

For example, when it is desired to form a pie crust of 8" diameter, the device is disposed atop a flat supporting surface and the mass or lump of dough 50 disposed on inner layer 18 over the center of indicia 30 (Figure 4). The tube is then folded on itself along transverse median line 12 and layers 16, 20 dropped over the dough mass 50 (Figure 5). Indicia 30, 32 will be visible through layers 16, 20 and 18, about mass 50. Thereupon, using a suitably sized and shaped roller, and applying same against the outer layer 16, mass 50 is worked and kneaded until it is extended to the outlines of the middle circle 30.

The nature of the material used in forming the device of the present invention is such that, while working mass 50 into the desired size and shape, layers 16 and 20, and layers 18 and 14 will shift and slide back and forth along each other. This feature renders it an extremely simple and easy means of guiding the dough mass within the desired limits. Further, the material is preferably of non-tacky nature. Of course, there are dough mixes available which are non-tacky, and, equally obviously, dusting materials can be employed on the mass of dough to reduce its tackiness.

With the device of the present invention, apart from the ease in forming the exact size and shape desired, there will be no waste or the necessity for trimming and cutting away excess dough. The device can be cleaned easily, and readied for use and reuse with no difficulty whatsoever.

Having now described the invention, what I claim and desire to secure by Letters Patent is:

1. An article of the character described comprising a sheet of substantially clear, transparent flexible material folded on itself at least twice on lines at right angles to each other to form a plurality of superpositioned, relatively slidable layers of substantially equal size, size and shape indicia on the lowermost layer, said indicia being readily visible through the other layers.

2. An article of the character described comprising an elongated, flattened tube of substantially clear transparent, flexible sheet material, folded on itself along a transverse median line to form a plurality of superpositioned, relatively slidable layers of substantially equal size and shape, size and shape indicia on the lowermost layer, said indicia being readily visible through the layers atop thereof.

MARY MANNERS HAMMERSTEIN.

REFERENCES CITED

The following references are of record in the file of this patent:

UNITED STATES PATENTS

| Number | Name | Date |
|---|---|---|
| 1,873,716 | Nickerson | Aug. 23, 1932 |
| 2,355,307 | Kors | Aug. 8, 1944 |
| 2,521,982 | Kors | Sept. 12, 1950 |
| 2,555,033 | Harris | May 29, 1951 |